United States Patent [19]

Minakawa et al.

[11] Patent Number: 5,000,477
[45] Date of Patent: Mar. 19, 1991

[54] SUSPENSION SYSTEM FOR AUTOMOBILES

[75] Inventors: Masaaki Minakawa; Masafumi Imanari; Shuichi Kato, all of Saitama, Japan

[73] Assignee: Honda Giken Kogyo Kabushiki Kaisha, Tokyo, Japan

[21] Appl. No.: 390,958

[22] Filed: Aug. 9, 1989

[30] Foreign Application Priority Data

Aug. 11, 1988 [JP] Japan .................................. 63-200726
Jul. 20, 1989 [JP] Japan .................................. 1-85170

[51] Int. Cl.$^5$ .................................................. B60G 3/20
[52] U.S. Cl. ..................................... 280/690; 280/698; 280/673
[58] Field of Search ............... 280/690, 701, 675, 688, 280/689, 723

[56] References Cited

U.S. PATENT DOCUMENTS

| | | | |
|---|---|---|---|
| 3,173,707 | 3/1965 | Péras | 280/701 |
| 3,891,232 | 6/1975 | Flemming | 280/701 |
| 4,261,591 | 4/1981 | Warne | 280/675 |
| 4,690,426 | 9/1987 | Kubo et al. | 280/701 |
| 4,790,560 | 12/1988 | Asunama et al. | 280/701 |

FOREIGN PATENT DOCUMENTS 0141092 5/1985 European Pat. Off. .
52-25319 2/1977 Japan .................................. 280/689
61-278407 12/1986 Japan .................................. 280/701

Primary Examiner—Charles A. Marmor
Assistant Examiner—Karin Tyson
Attorney, Agent, or Firm—Armstrong, Nikaido, Marmelstein, Kubovcik & Murray

[57] ABSTRACT

A pair of upper and lower radius rods are connected at their rear ends to upper and lower portions of a swingable link system which includes a knuckle and upper and lower control arms, and have their front ends interconnected and pivotally connected to a vehicle body through an elastic support member for vertical swinging movement, and an included angle between two straight lines connecting the pivoted point and respective rear end of the radius rods is set to be an acute angle. This enables application of a force to the elastic support member between the radius rods and the vehicle body to be distinguished from (a) when a braking force has been applied to the wheel and (b) when the longitudinal load has been applied to a central portion of the wheel. Thus, it is possible to provide a larger longitudinal compliance while insuring a caster rigidity of the suspension system, thereby satisfying both (a) a straight advancing property during braking and (b) a shock absorbing property during travelling on a bad road surface. Moreover, it is possible to improve the riding comfort during braking.

14 Claims, 9 Drawing Sheets

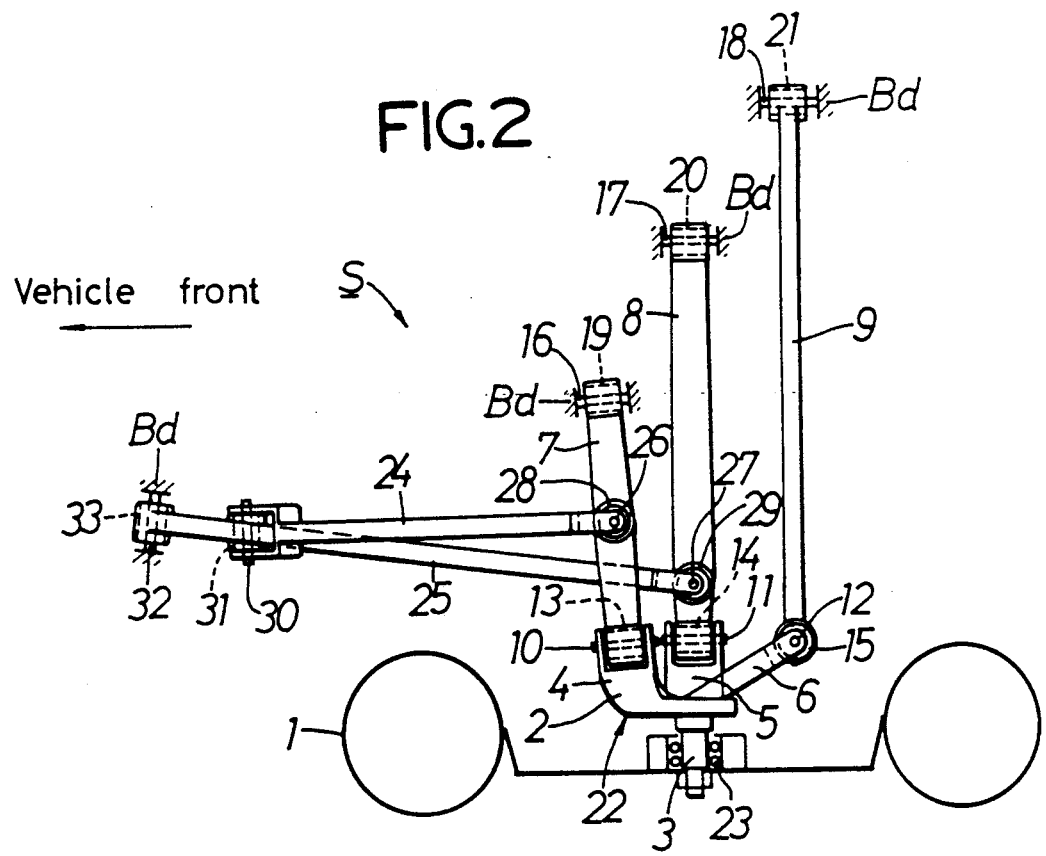
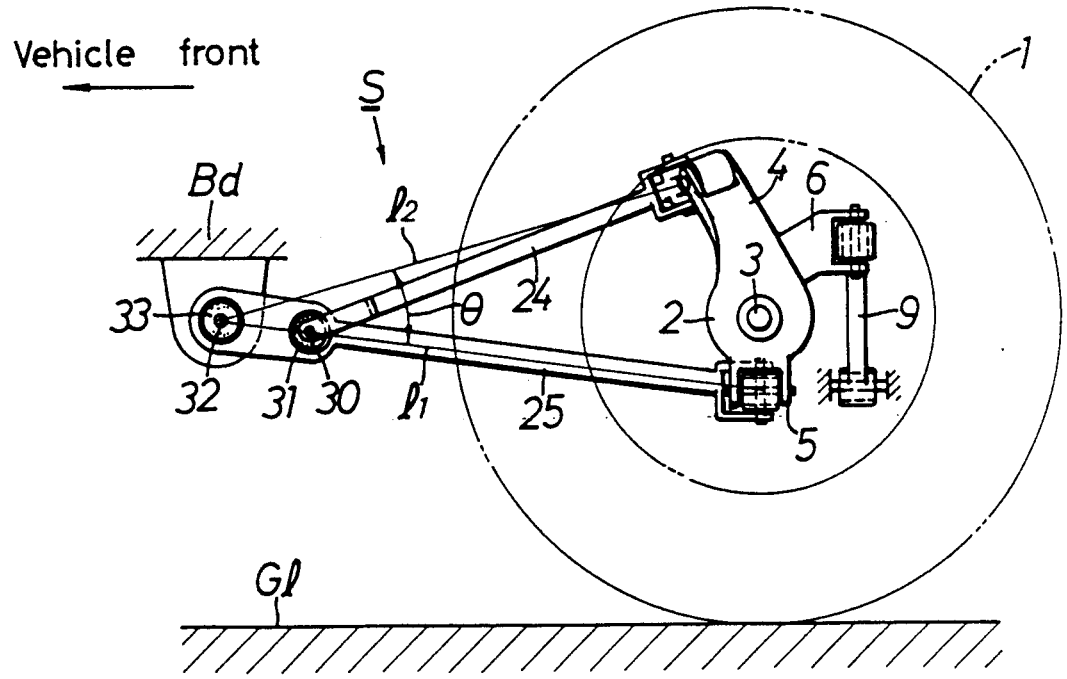

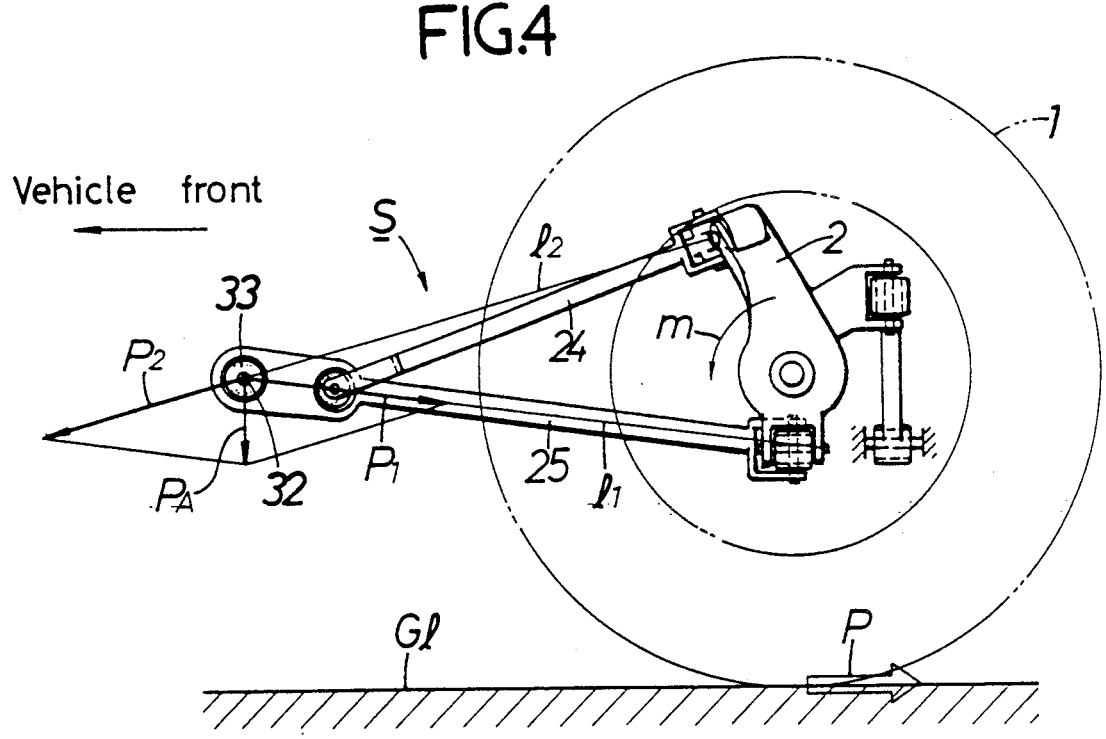
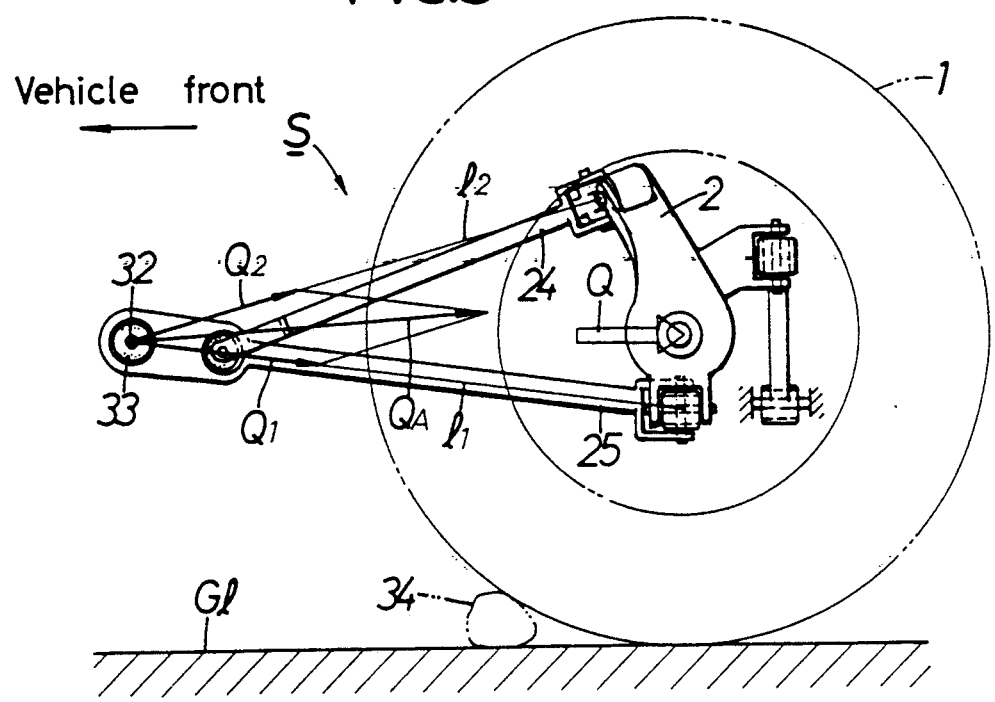

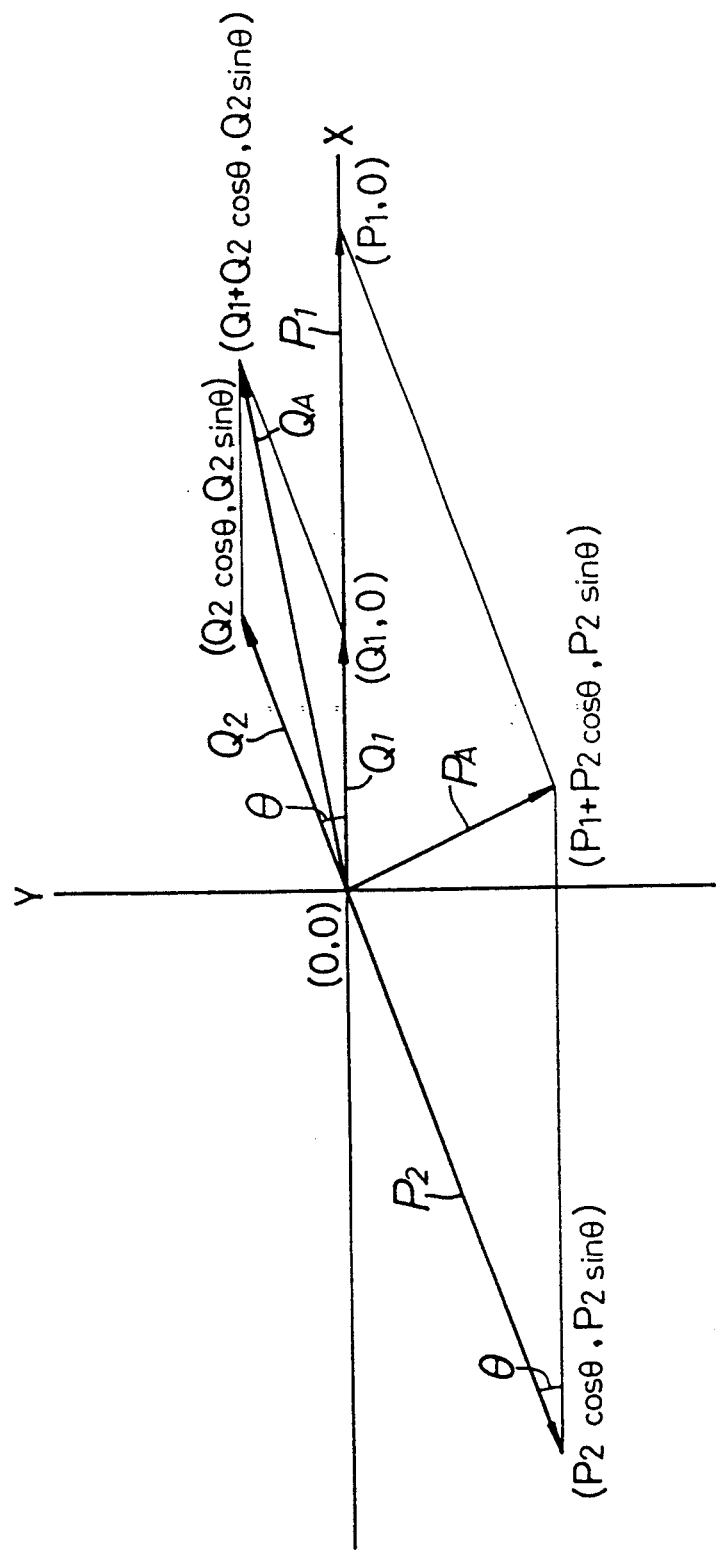

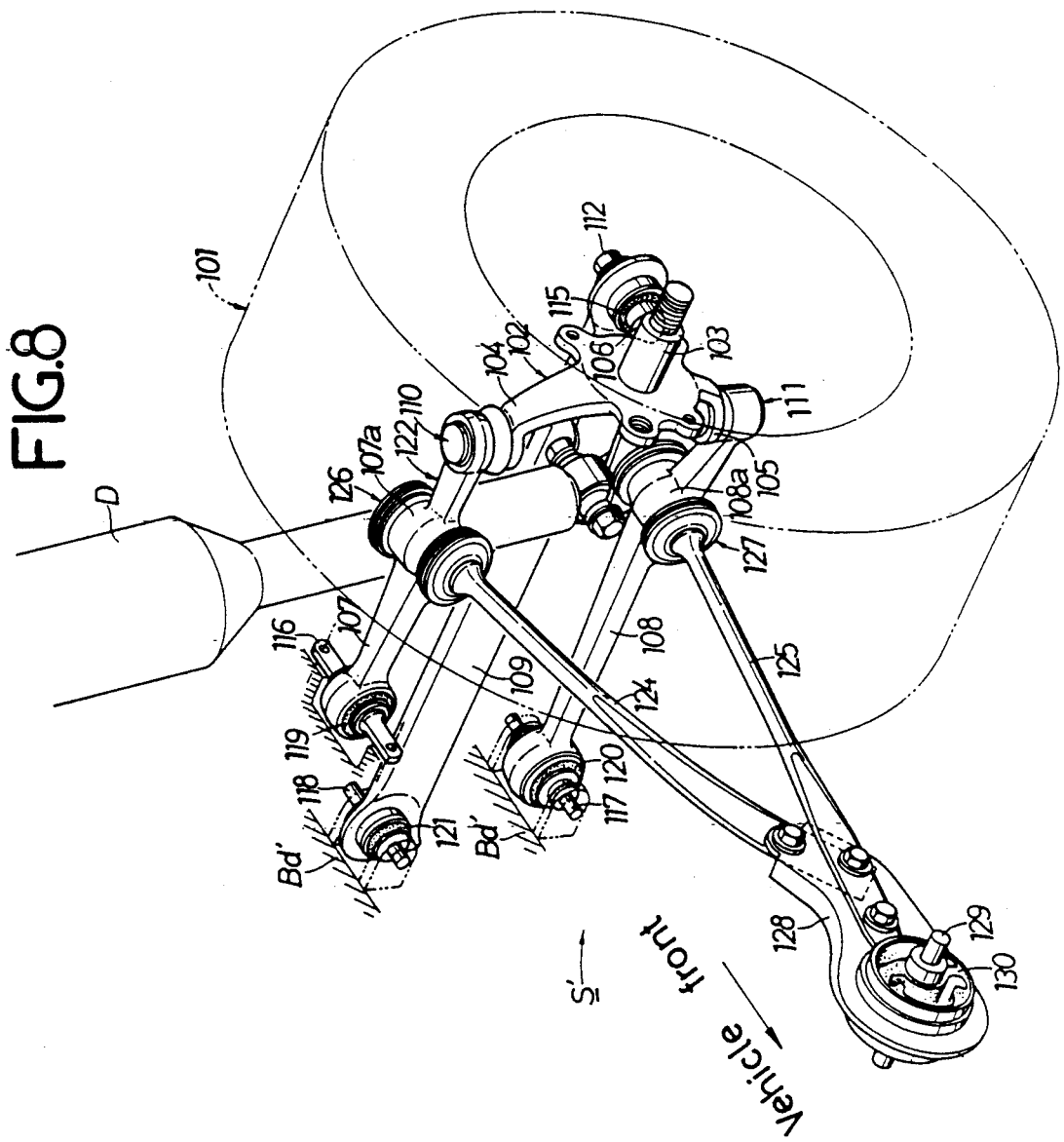

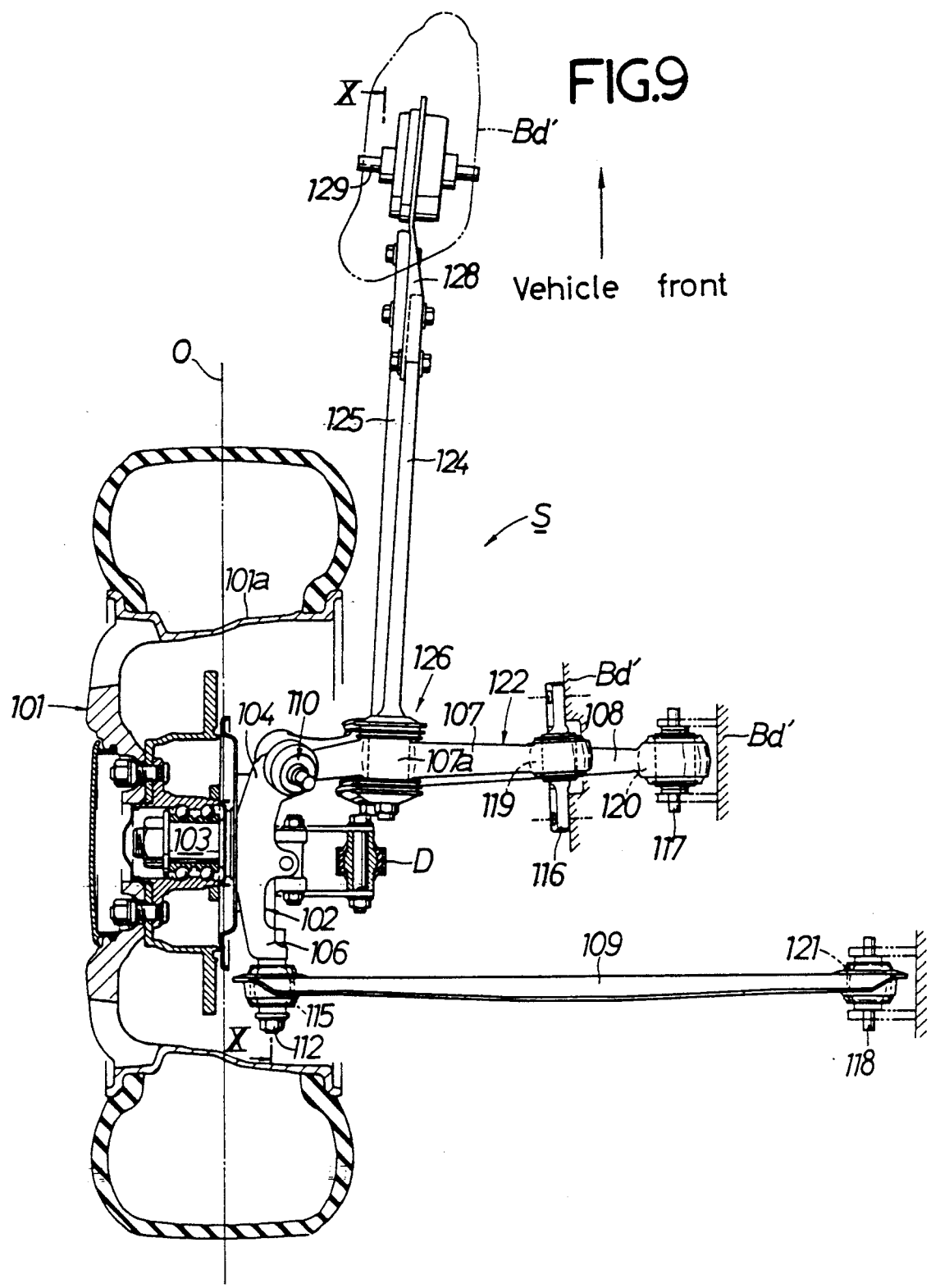

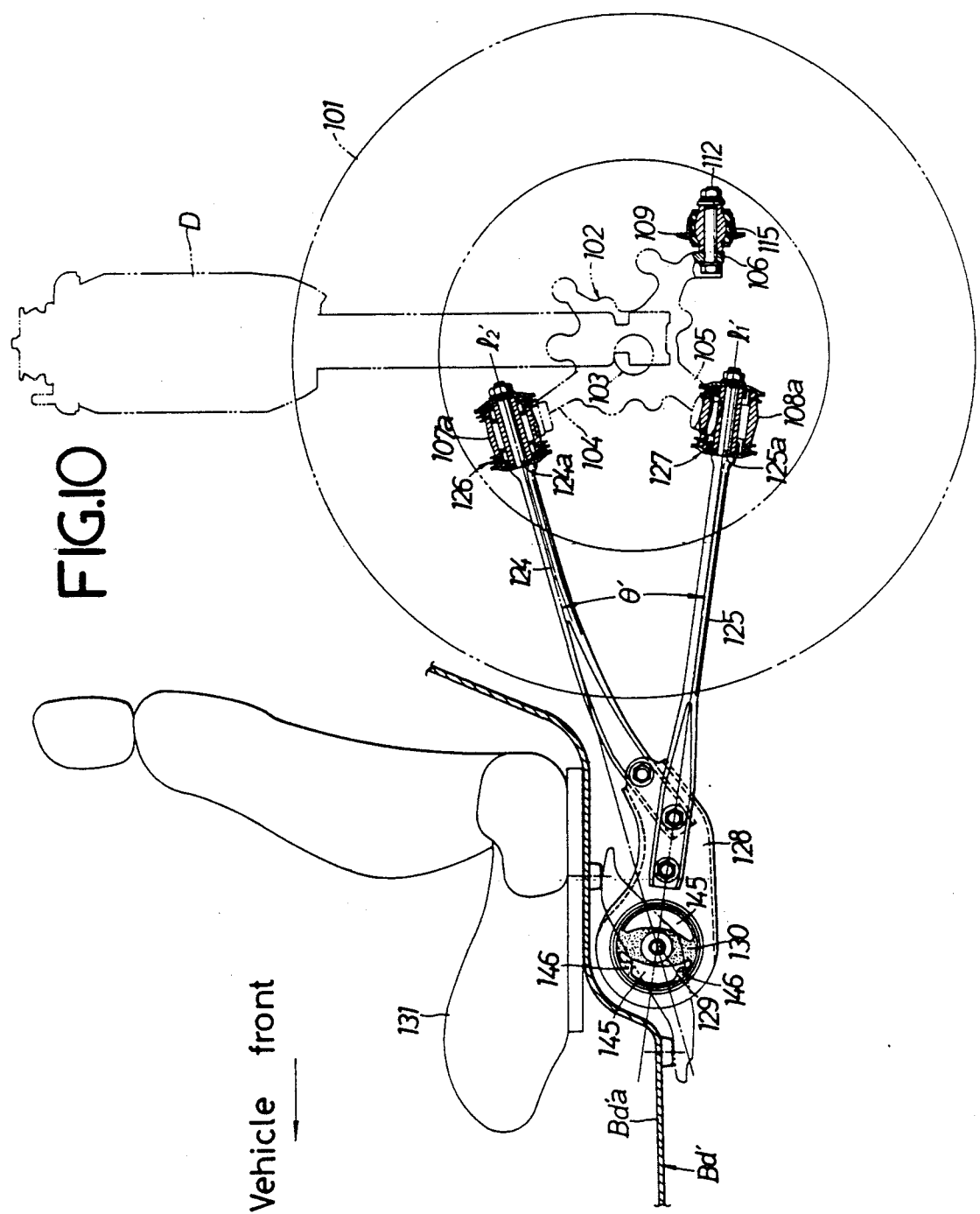

SUSPENSION SYSTEM FOR AUTOMOBILES

BACKGROUND OF THE INVENTION

1. Field Of The Invention

The field of the present invention is suspension systems for automobiles, and particularly, an improvement in the suspension system for automobiles comprising a pair of upper and lower control arms which are linked to a knuckle carrying a wheel and are pivotally connected at their base ends to a vehicle body for vertical swinging movement.

2. Description Of The Prior Art

A double wishbone type suspension system is widely known (for example, see Japanese Patent publication No. 28123/69).

In such a prior art suspension system, the base ends of the upper and lower control arms are pivotally connected to a horizontal shaft fixedly mounted on a vehicle body through elastic support members, respectively and hence, a longitudinal compliance and a caster rigidity during braking are governed by the spring constant of the elastic members.

In general, in order to prevent, a shock, produced when a wheel goes over a protrusion on a road surface, from being transmitted to the vehicle body. It is necessary to increase the longitudinal compliance of the suspension system. In addition, in order to insure a straight advancing property of the wheel, it is necessary to increase the caster rigidity of the suspension system.

In the above prior art suspension system, however, if the spring constant of the elastic member is set smaller to provide a larger longitudinal compliance, the caster rigidity is reduced to degrade the straight advancing property of the wheel. On the other hand, if the spring constant of the elastic member is set larger to provide a larger caster rigidity during braking, the longitudinal compliance is reduced, accompanied by an adverse deterioration of the riding comfort. Therefore, it is difficult to satisfy both of the longitudinal compliance and the caster rigidity during braking.

Even if a non-linear spring characteristic is provided to the elastic support members, it is impossible to insure longitudinal compliance during braking.

SUMMARY OF THE INVENTION

The present invention has been accomplished with such circumstances in view, and it is an object of the present invention to provide a simplified and effective suspension system of the type described above, in which both of the longitudinal compliance and the caster rigidity during braking can be satisfied and moreover, the riding comfort during braking can be improved.

To attain the above object, according to the present invention, there is provided a suspension system for automobiles, comprising a pair of upper and lower control arms which are linked to a knuckle carrying a wheel and are pivotally connected at their base ends to a vehicle body for vertical swinging movement therefore. The system further includes a pair of upper and lower radius rods connected at their rear ends respectively to upper and lower portions of a swingable link system which comprises the knuckle and the upper and lower control arms. The radius rods have their front ends interconnected and are pivotally connected to the vehicle body through an elastic support member for vertical swinging movement, so that an included angle between two straight lines connecting a pivoted point of the radius rods to the vehicle body, and respective rear ends of the radius rods is an acute angle.

With the above construction, a pulling force and a compressing force act on both the radius rods along the two straight lines by a moment applied to the wheel from a road surface during braking and therefore, a resultant force (a first resultant force) thereof becomes smaller than the pulling force and compressing force. Thus, the amount of deformation of the elastic support members by the first resultant force is relative small, thereby insuring a caster rigidity of the suspension system.

In addition, when a longitudinal load has been applied to a central portion of the wheel, only the pulling force or only the compressing force acts on both the radius rods along the two straight lines and hence, a resultant force (a second resultant force) thereof becomes larger than the pulling force and the compressing force. Thus, the amount of deformation of the elastic support member by the second resultant force is relatively large and this makes it possible to provide a large longitudinal compliance of the suspension system.

The above and other objects, features and advantages of the invention will become apparent from reading the following description of the preferred embodiments, taken in conjunction with the accompanying drawings.

BRIEF DESCRIPTION OF THE DRAWINGS

FIGS. 1 to 5 illustrate a first embodiment of the present invention, wherein

FIG. 1 is a perspective view of a left rear suspension system for automobile;

FIG. 2 is a plan view of the suspension system;

FIG. 3 is a side view of the suspension system;

FIG. 4 is a side view for explaining an operation during braking; and

FIG. 5 is a side view for explaining an operation when a wheel goes over a protrusion on a road surface;

FIG. 6 is a diagram illustrating coordinates for forces acting on an elastic bush at a front end of a lower radius rod;

FIGS. 8 to 14 illustrate a third embodiment, wherein

FIG. 8 is a perspective view of a left, rear suspension system for an automobile;

FIG. 9 is a plan view of the suspension system;

FIG. 10 is a sectional view taken along a line X—X in FIG. 9;

FIG. 11 is an enlarged view in longitudinal section of an upper elastic connecting means shown in FIG. 10;

FIG. 12 is an enlarged view in longitudinal section of lower elastic connecting means shown in FIG. 10;

FIG. 13 is a side view for explaining an operation during braking; and

FIG. 14 is a side view for explaining an operation when a wheel goes over a protrusion on a road surface.

DESCRIPTION OF THE PREFERRED EMBODIMENTS

The present invention will now be described in more detail by way of embodiments with reference to the accompanying drawings.

A first embodiment of the present invention will be first described in conjunction with FIGS. 1 to 5.

Figure 1:
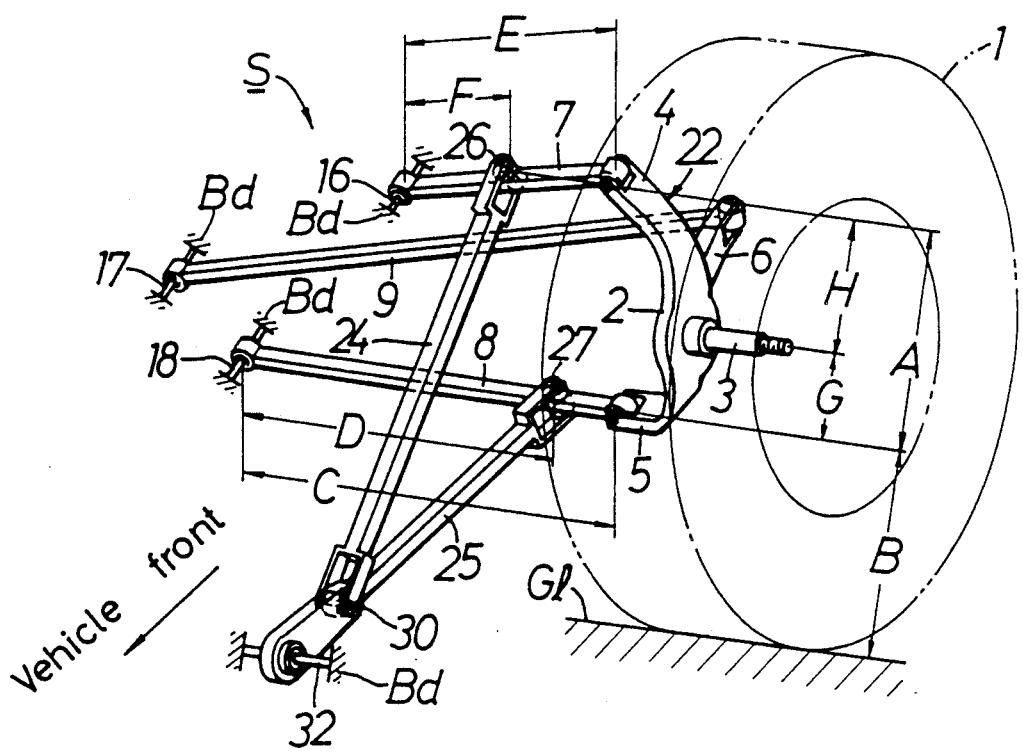

FIG. 1 is a perspective view of a left half of a rear suspension system for automobiles to which the present invention is applied; FIG. 2 is a plan view of the system, and FIG. 3 is a side vieW of the system Referring to these figures, a knuckle 2 for carrying a wheel I comprises a spindle 3 for supporting the wheel 1 through a bearing 23 (FIG. 2). and an upper support arm 4, a lower support arm 5 and a rear support arm 6 which arms project from a base end of the spindle 3 in three directions, i.e., upwardly, downwardly and rearwardly, respectively. An upper control arm 7, a lower control arm s and an auxiliary control arm 9 are oscillatably connected at their tip ends to the support arms 4, 5 and 6 through connecting shafts 10, 11 and 12 and elastic bushes 13, 14 and 15 surrounding these shafts, respectively.

The control arms 7, 8 and 9 are I-shaped and arranged widthwisely of a vehicle, and are pivotally connected at their base ends to a vehicle body Bd through pivots 16, 17 and 18 extending longitudinally of the vehicle and elastic bushes 19, 20 and 21 surrounding the pivots, respectively. Thus, the control arms 7, 8 and 9 are vertically swingable about the pivots 16, 17 and 18, and are also slightly swingable longitudinally by the deformation of the elastic bushes 19, 20 and 21.

It should be noted that a suspension spring (not shown) is interposed between at least one of the three control arms 7, 8 and 9 and the vehicle body Bd, as is in the prior art.

A pair of upper and lower radius rods 24 and 25 extending longitudinally of the vehicle are oscillatably connected at their rear ends to upper and lower portions of a swingable link system 22 which comprises the knuckle 2 and the upper and lower control arms 7 and 8, through vertical connecting shafts 26 and 27 and elastic bushes 28 and 29 surrounding these shafts, respectively. Connected points of the rear ends of the radius rods 24 and 25 to the swingable link system 22 are established on the upper and lower control arms 7 and B in the illustrated embodiment, but alternatively, they may be established on the upper control arm 7 and the lower support arm 5 of the knuckle 2, or on the upper and lower support& arms 4 and 5 of the knuckle 2.

The radius rods 24 and 25 are rotatably interconnected through a connecting shaft 30 extending widthwisely of the vehicle and an elastic bush 31 surrounding the shaft 30 in the present embodiment, and one of the radius rods, e.g., the lower radius rod 25 in the illustrated embodiment, is pivotally connected at its front end to the vehicle body Bd through a pivot 32 extending widthwisely of the vehicle and an elastic bush 33 which is an elastic support member. Thus, during vertical movement of the wheel 1, the radius rods 24 and 25 can be vertically swung about the pivot SZ and can be relatively pivotally moved about the connecting shaft 30 as the upper and lower control arms 7 and 8 are vertically swung.

Here, the included angle $\theta$ between two straight lines $l_1$ and $l_2$ connecting a front end of the lower radius rod 25, i.e., a pivotally connected point thereof corresponding to the pivot 32 with respective rear ends of the radius rods 24 and 25, is set at an acute angle.

The operation of this embodiment will be described below.

Referring first to FIG. 4, suppose that the wheel 1 has been braked by the operation of a brake device (not shown) during travelling to the vehicle.

When the wheel 1 has been braked, a counterclockwise moment m as viewed, in FIG. 4 acts on the knuckle 2 by a frictional braking force P applied to the wheel 1 from a road surface G1. Consequently, a pulling force $P_1$ along the straight line $l_1$ and a compressing force $P_2$ along the straight line $l_2$ act on the radius rods 25 and 24, and a resultant force $P_A$ of the forces $P_1$ and $P_2$ is applied as a downward load to the elastic bush 33.

Because the included angle 0 between the two lines $l_1$ and $l_2$ is set at an acute angle, the resultant force $p_A$ is smaller than the pulling force $P_1$ and the compressing force $P_2$. Therefore, the amount of elastic bush 33 deformed by the resultant force $P_A$ is relatively small and hence, the variation in caster of the wheel 1 is small, enabling the straight advancing property of the wheel to be kept at a high level.

Referring to FIG. 5, suppose that the wheel goes over a protrusion 34 such as a pebble on a road surface during travelling of the vehicle.

When the wheel 1 goes over the protrusion 34, a load Q directed rearwardly of the vehicle and applied to a central portion of the wheel 1 from the protrusion 34 acts, in the form of pulling forces $Q_1$ and $Q_2$ along the two straight lines $l_1$ and $l_2$, on the radius rods 24 and 25 via the knuckle 2, and a resultant force $Q_A$ of the forces $Q_1$ and $Q_2$ is applied in the form of a rearward load to the elastic bush 33.

Thus, the resultant force $Q_A$ is larger than the pulling forces $Q_1$ and $Q_2$, because the included angle $\theta$ between the two straight lines $l_1$ and $l_2$ is an acute angle. Therefore, the amount of deformation of the elastic bush 33 by the resultant force $Q_A$ is large and hence, a large longitudinal compliance is applied to the suspension system S. This makes it possible to effectively moderate an impact force from the protrusion 34 and to prevent the impact force from being transmitted to the vehicle body Bd.

Because the resultant forces $P_A$ and $Q_A$ act in different directions, It is possible to fully insure the longitudinal compliance even during braking and also to improve the riding comfort during braking.

Here, dimensions of individual portions of the suspension system S are set as shown in FIG. 1. They are as follows:

A—Distance between the rear ends of the radius rods 24 and 25;

B—Distance from the rear end of the lower radius rod 25 to the road surface G1;

C—Effective length of the lower control arm 8;

D—Distance from the base end of the lower control arm 8 to the rear end of the lower radius rod 25;

E—Effective length of the upper control arm 7;

F—Distance from the base end of the upper control arm 7 to the rear end of the upper radius rod 24:

G—Distance from the axis of the wheel 1 to the rear of the lower radius rod 25; and H—Distance from the axis of the wheel 1 to the rear end of the upper radius rod 24.

If the dimensions are set in this manner, the forces $P_1$, $P_2$, $Q_1$ and $Q_2$ can be determined in the following expressions, wherein the pulling force is positive and the compression force is negative.

$$P_1 = P \times \frac{A+B}{A} \times \frac{C}{D} \tag{1}$$

$$-P_2 = P \times \frac{B}{A} \times \frac{E}{F} \tag{2}$$

$$Q_1 = Q \times \frac{H}{G+H} \times \frac{C}{D} \tag{3}$$

-continued $$Q_2 = Q \times \frac{G}{G+H} \times \frac{E}{F} \quad (4)$$

FIG. 6 illustrates coordinates for the above-described forces $P_1$, $P_2$, $P_A$, $Q_1$, $Q_2$ and $Q_A$ when the suspension system S is viewed sideways, wherein the axis of the lower radius rod 25 is shown by the X axis, and the front end, i.e. the pivoted point of the rod 25 is shown as a point of (0, 0)

As apparent from FIG. 6, the resultant forces $P_A$ and $Q_A$ are different in direction from each other because P2 is negative, and in order that the directions of the resultant forces $P_A$ and $Q_A$ are at a right angle, the following equation may be established.

$$(P_1 + P_2 \cdot \cos\theta)(Q_1 + Q_2 \cdot \cos\theta) + P_2 \cdot Q_2 \cdot \sin^2 = 0 \quad (5)$$

Here, $\cos\theta$ can be determined by the following equation.

$$\cos\theta \frac{\lambda_3^2 \cdot \lambda_4 - \lambda_2^2 (\lambda_1 + 1)}{\lambda_2 \cdot \lambda_3 \{1 - (\lambda_1 + 1)\lambda_4\}} \quad (6)$$

wherein
$\lambda_1 = A/B$
$\lambda_2 = C/D$
$\lambda_3 = E/F$
$\lambda_4 = G/H$

Accordingly, the directions of the resultant forces $P_A$ and $Q_A$ can be set so that they may form a right angle therebetween, regardless of the magnitude of the loads p and Q, by proper selection of the included angle $\theta$ between the two straight lines $l_1$ and $l_2$.

If such an establishment is made, even when the resultant forces $P_A$ and $Q_A$, are concurrently applied to the elastic bush 33, i.e., even when the wheel 1 goes over the protrusion 34 during braking, it is possible to prevent any excessive deformation of the elastic bush 33 in a direction of the resultant force $P_A$ permitting the variation in caster of the wheel 1 to be reduced.

Figure 7:
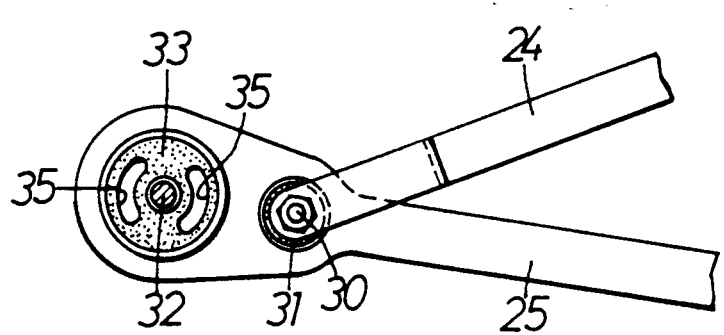
FIG. 7 is a side view of only an essential portion of a second embodiment of the present invention.

FIG. 7 illustrates a second embodiment of the present invention, which is applicable to a case where the angle $\theta$ is set so that the directions of the resultant forces $P_A$ and $Q_A$ form a right angle therebetween, and in which the elastic bush 33 is provided with a pair of arcuate cut-away portions 35, 35 arranged in the direction of the resultant force $Q_A$ with the pivot 32 located therebetween, so that the spring constant of the elastic bush 33 may be set smaller in the direction of the resultant force $Q_A$ and larger in the direction of the resultant force $P_A$. Other arrangements are similar to those in the previously-described first embodiment, wherein portions corresponding to those in the first embodiment are designated by the same reference numerals.

According to the second embodiment, an elastic bush 33 is easily deformable in the direction of the resultant force $Q_A$ even if the spring constant of the elastomer itself forming the elastic bush 33 is set larger, and hence it is possible to further improve the longitudinal compliance, while insuring the caster rigidity of the suspension system S.

A third embodiment of the present invention will be described below in conjunction with FIGS. 8 to 14.

FIG. 8 is a perspective view of a left, rear suspension system S' for an automobile to which the present invention is applied; FIG. 9 is a plan view of the system S', and FIG. 10 is a side view of the system S'. In these Figures, a knuckle 102 for supporting a wheel 101 has the basically same structure as in the previous first embodiment and includes a spindle 103, an upper support arm 104, a lower support arm 105, and a rear support arm 106. Upper and lower control arms 107, 108 are connected at their tip ends to the upper and lower support arms 104 and 105 through ball joints 110 and 111, inside a rim 101a of the wheel 101, respectively, and an auxiliary control arm 109 is likewise connected at its tip end to the rear support arm 106 through a connecting shaft 112 and an elastic bush 115 surrounding the shaft 112 at a location inside the rim 101a.

The control arms 107, 108 and 109 are I-shaped and arranged widthwisely of a vehicle as in the previous first embodiment, and have their base ends pivotally connected to a vehicle body Bd' through pivots 116, 117 and 118 extending longitudinally of the vehicle and elastic bushes 119, 120 and 121 surrounding the pivots.

Thus, the knuckle 102 and the two control arms 107 and 108 constitute a swingable link system 122 in accordance with the third embodiment.

A damper D with a suspension spring is interposed between the knuckle 102 and the vehicle body Bd'.

Upper and lower radius rods 124 and 125 are oscillatably connected at their rear ends to intermediate portions of the upper and lower control arms 107 and 108 which are close to an inner side of the wheel 101. The connection of the radius rods 124 and 125 is through an upper and lower elastic connecting means 126 and 127, respectively.

Unlike the first embodiment, front ends of the radius rods 124 and 125 are joined to a common support plate 128, for example, by means of a bolt or by welding, so that they are secured to each other. The support plate 128 is pivotally connected to the vehicle body Bd' through a pivot 129 extending widthwisely of the vehicle and an elastic bush 130 made of a rubber as an elastic support member surrounding the pivot 129.

As in the second embodiment, the elastic bush 130 is provided with a pair of cut-away portions 145, 145 arranged in front and in rear of the pivot 129 located therebetween. This construction permits a spring constant of the elastic bush 130 to be set larger in a vertical direction and smaller in a longitudinal direction. Further, the elastic bush 130 is provided with elastic strapper 146 for restricting the forward displacement of the pivot 129 by an amount more than a given amount in a buffering manner.

A suitable flexure elasticity is provided to both the radius rods 124 and 125 in the illustrated embodiment, but alternatively, the flexure elasticity may be provided to either one of the radius rods 124 and 125.

An included angle $\theta'$ is between two straight lines: a straight line $l_2'$ connecting respective centers of the pivot 129 and the upper elastic connecting means 126 and a straight line $l_1'$ connecting respective centers of the pivot 129 and the lower elastic connecting means 127. The included angle is set at an acute angle, as shown in FIG. 10.

In this case, the lower radius rod 125 is formed into a rectilinear shape and disposed on the straight line $l_1'$. On the other hand, the upper radius rod 124 is disposed with its rear half on the straight line $l_2'$ but its front half downwardly bent below the straight line $l_2'$. A floor plate Bd'a of the vehicle body is disposed along the upper radius rod 124 to effectively utilize a space above the front half of the upper radius rod 124 for a compartment, and a seat 131 is disposed on the surface of the floor plate Bd'a in proximity to the front half of the upper radius rod 124.

The upper and lower elastic connecting means 126 and 127 will be described below with reference to FIGS. 11 and 12.

Figure 11:
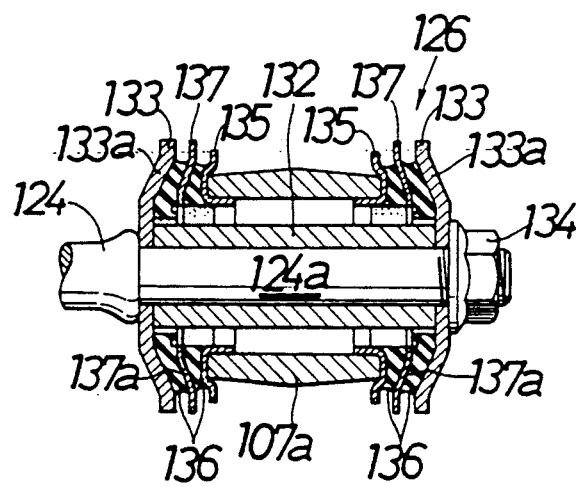
Figure 12:
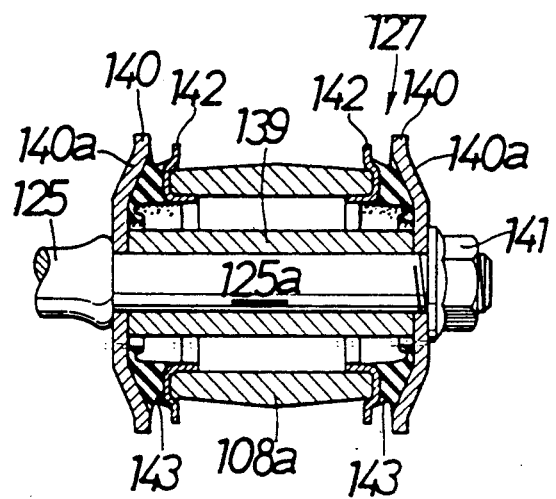

Referring to FIG. 11, the upper elastic connecting means 126 will be first described. The upper radius rod 124 is integrally provided at its rear end with a bolt 124a extending through a boss 107a which is formed at a intermediate portion of the upper control arm 107. A distance collar 132 and a pair of outer support plates 133, is opposed to each other with the boss 107a interposed therebetween are secured to the bolt 124a by means of a nut 134. Each of the outer support plates 133 includes a tapered portion 133a located closer to the boss at a radial outer portion thereof than at a radial inner portion thereof. An annular rubber elastomer 136 is bonded or joined between the tapered portion 133a and an inner, annular support plate 135 fitted over an end of the boss 107a to which the tapered portion 133a is opposed. An annular shape-retaining plate 137 is buried in the elastomer 136 at its axially middle portion and also includes a tapered portion 137a similar to that of the outer support plate 133. The inner support plate 135, the elastomer 136 and the shape-retaining plate 137 are disposed to surround the distance collar 132 at a distance.

The lower elastic connecting means 127 will be described in conjunction with FIG. 12. The lower radius rod 125 is integrally provided at its rear end with a bolt 125a extending through a boss 108a which is formed at an intermediate portion of the lower control arm 108. A distance collar 139 and a pair of outer support plates 140, 140, opposed to each other with the boss 108a interposed therebetween, are secured to the bolt 125a by means of a nut 141. Each of the outer support plates 140 includes a tapered portion 140a located closer to said the boss at a radial outer portion thereof than at a radial inner portion thereof. An annular rubber elastomer 143 is bonded or joined between the tapered portion 140a and an inner, annular support plate 142 fitted over an end of the boss 108a to which the tapered portion 140a is opposed. Either of the inner support plate 142 and the elastomer 143 are disposed to surround the distance collar 139 at a distance.

Each of the respective tapered portions 133a and 140a of the outer support plates 133 and 140 is formed so that a perpendicular to its inner surface extends through a central portion of a corresponding one of the elastic connecting means 126 and 127.

The operation of the third embodiment will be described below.

Figure 13:
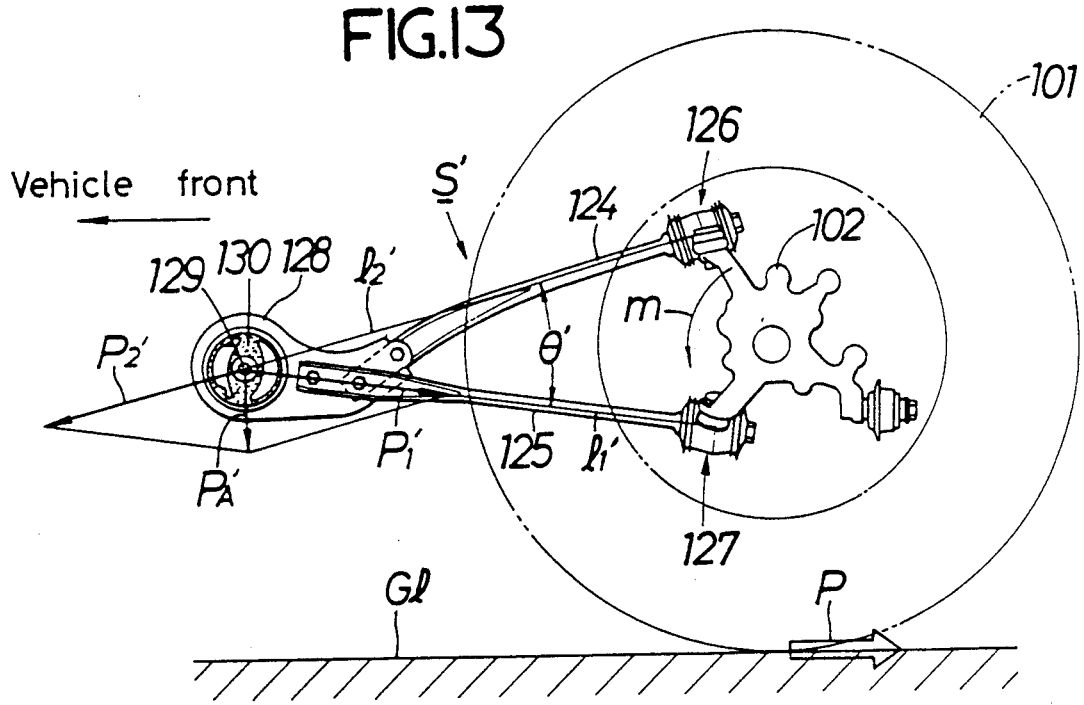

Referring first to FIG. 13, suppose that the wheel 101 has been braked by the operation of a brake device during travelling of an automobile.

When the wheel 101 has been braked, a counterclockwise moment m as viewed in FIG. 13 is applied to the knuckle 102 by a frictional braking force applied to the wheel 101 from a road surface G, as in the previous first embodiment. Consequently, a compressing force $P_2'$ along the straight line $l_2'$ and a pulling force $P_1'$ along the straight line $l_1'$ act on the radius rods 124 and 125, with a resultant force $P_A'$ thereof being applied as a downward load to the elastic bush 130.

Because the included angle $\theta'$ between the two straight lines $l_1'$ and $l_2'$ has been set at an acute angle, the resultant force $P_A'$ is smaller than the compressing force $P_2'$ and the pulling force $P_1'$ as in the previous first embodiment. Moreover, the spring constant of the elastic bush 130 is set larger in a direction of the resultant force $P_A'$ and hence, the amount of elastic bush deformed by the resultant force $P_A'$ is smaller. As a result, the variation in caster of the wheel 101 is smaller and this makes it possible to insure a straightly advancing property of the wheel 101.

In this case, even if the front half of the upper radius rod 124 has been downwardly bent in order to define a compartment as large as possible as described above, the compressing force $P_2'$ applied to the upper radius rod 124 from the knuckle 102 will be directed to a center of the pivot 129 because the rear half of the upper radius rod 124 is disposed on the straight line $l_2'$. Therefore, a component of the compressing force $P_2'$ acting as a bending load on the lower radius rod 125 is extremely small.

Moreover, because the lower radius rod 125 is disposed on the straight line $l_1'$, the pulling force $P_1'$ applied to the lower radius rod 125 from the knuckle 102 will become a simple pulling load.

As a result, the lower radius rod 125 only slightly receives the bending load and hence, it is possible to make form the lower radius rod 125 from a relatively thin rounded rod, contributing to a reduction in weight.

In addition, the compressing force $P_2'$ and the pulling force $P_1'$ act as a simple compressing force on the elastomers 136 and 143 between the outer and inner support plates 133, 140 and 135, 142 located in proximity to each other in the corresponding elastic connecting means 126 and 127 and moreover, the elastomers 136 and 143 are inhibited from protruding radially outwardly by the tapered portions 133a and 140a of the outer support plates 133 and 140 and hence, the amount of each elastomer 136, 143 is deformed is small and thus, the variation in caster of the wheel 101 due to such a deformation is extremely small.

Figure 14:
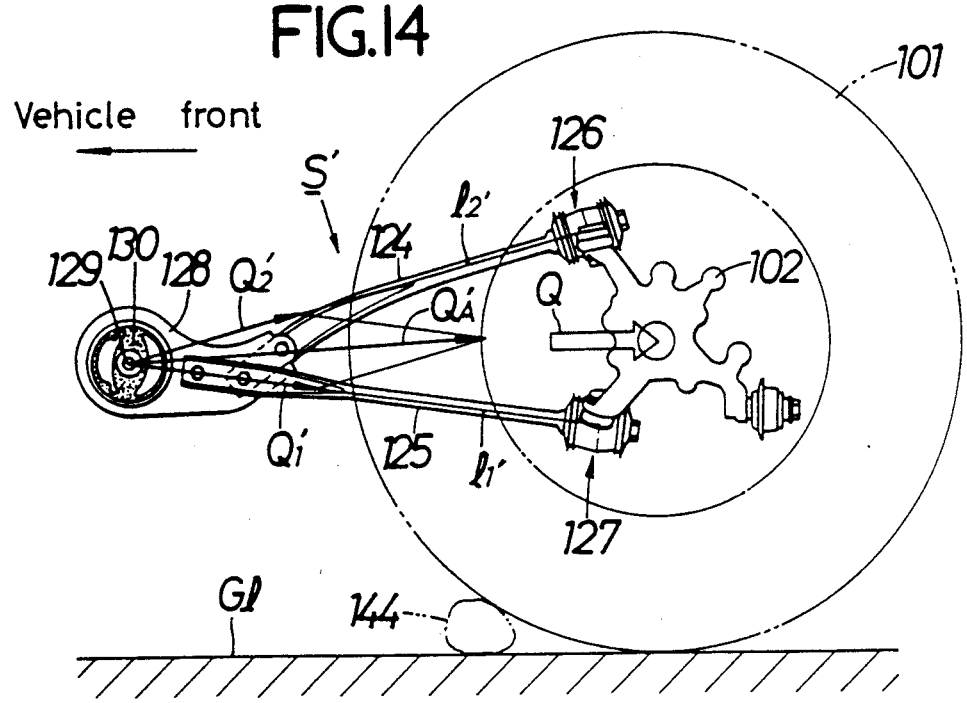

Referring to FIG. 14, suppose that the wheel 101 goes over a protrusion 144 such as a pebble on a road surface G1 during travelling of a vehicle.

When the wheel gets over the protrusion 144, a rearward load Q applied to the central portion of the wheel 101 from the protrusion 144 acts as pulling forces $Q_1'$ and $Q_2'$ along the two straight lines $l_1'$ and $l_2'$ to both the radius rods 125 and 124 through the knuckle 102, as in the previous first embodiment, with a resultant force $Q_A'$ thereof being applied as a rearward load to the elastic bush 130.

Because the included angle $\theta'$ between the two straight lines $l_1'$ and $l_2'$ is an acute angle, the resultant force $Q_A'$ is larger than the pulling forces $Q_1'$ and $Q_2'$ as in the first embodiment. Moreover, since the spring constant of the elastic bush 130 has been set smaller in the direction of the resultant force $Q_A'$, the amount of deformation of the elastic bush 130 by the resultant force $Q_A'$ is large. Consequently, a larger longitudinal compliance is applied to the suspension system S'. This makes it possible to effectively moderate an impact force from the protrusion and prevent it from being transmitted to the vehicle body Bd'.

Because the directions of action of the resultant forces $P_A'$ and $Q_A'$ are different from each other, it is possible to fully insure the longitudinal compliance even during braking and also to improve the riding comfort during braking.

With deformation of the elastomers 106 and 143, a load in a direction to somewhat increase or decrease the included angle θ' is applied to the upper and lower radius rods 124 and 125 from the upper and lower control arms 107 and 108 during upward and downward movements and braking of the wheel 101, but the upper radius rod 124 and/or the lower radius rod 125 properly deflect(s) to permit the deformation of the elastomers 136 and 143. This enables securing of the front ends of the radius rods 124 and 125 to each other, leading to a simplification of the structure.

Particularly during upward and downward movements of the wheel 101, a three-dimensional rotative displacement occurs betWeen the outer support plates 133, 140 and the inner support plates 135, 142 in the individual elastic connecting means 126 and 127 as a result of upward and downward swinging movements of the upper and lower control arms 107 and 108 as well as the upper and lower radius rods 124 and 125. However, because the bonded or joined portions between the support plates 133, 140 and the elastomers 136, 143 are the tapered portions 133a and 140a, the elastomers 136 and 145 can be relatively easily deformed upon receiving a thrust force by all rotational displacements, thereby smoothing the upward and downward movements of the wheel 101, while preventing a larger torsional torque from acting on the radius rods 124 and 125.

In such a suspension system S', since the tip ends of the upper and lower control arms 107 and 108 are connected to the knuckle 102 at locations which are inside the rim 101a of the wheel 101, it is possible to dispose their connected points in proximity to a center plane O in which the wheel rotates. Consequently, when the wheel 101 has received a load from a road surface, the burden of the load on the individual control arms 107 and 108 can be reduced to a minimum.

In addition, since the rear ends of the upper and lower radius rods 124 and 125 are connected to the intermediate portions of the upper and lower control arms 107 and 108, it is possible to form each of the radius rods 124 and 125 into a rectilinear shape or a nearer shape without any interference by the wheel 101 to enhance its stretching or bracing function.

It will be understood that the present invention is also applicable to a front suspension system for automobiles. In this case, in place of the auxiliary control arm 109, a tie rod connected to a steering mechanism can be, of course, connected to the rear support arm is of the knuckle 102 through a ball joint.

What is claimed is:

1. A suspension system for an automobile comprising:
a swingable link system including
   a knuckle which carries a wheel of the automobile, and
   a pair of upper and lower control arms linked to said knuckle and pivotally connected at base ends thereof to a vehicle body for vertical swinging movements; and
a pair of upper and lower radius rods which are connected at respective rear ends thereof to upper and lower portions of the swingable link system,
   front ends of the radius rods connected together and pivotally connected to the vehicle body for vertical swinging movements,
   an included angle is defined as being between two straight lines which connect a pivoted point of said radius rods to the vehicle body with said rear ends of the radius rods, respectively, said included angle to be an acute angle,
   said lower radius rod is disposed on one of the straight lines that connects said pivoted pint with the rear end of the lower radius rod,
   said upper radius rod is bent at an intermediate portion thereof and is disposed at a rear half portion thereof on the other of the straight lines that connects said pivoted point with the rear end of the upper radius rod, a front half portion of the upper radius rod being located below said other straight line.

2. A suspension system according to claim 1, wherein said upper and lower radius rods are disposed such that a first resultant force of a compressing force and a first pulling force, which act on the radius rods along said two straight lines when a load has been applied to a central portion of the wheel in a longitudinal direction of the vehicle body.

3. A suspension system according to claim 2, wherein said elastic support member has a spring constant set to be large in a direction of said first resultant force and to be small in a direction of said second resultant force.

4. A suspension system according to claim 1, wherein at least one of the radius rods is elastically flexible and the front ends of the radius rods are secured to each other.

5. A suspension system according to claim 1, wherein said upper and lower control arms are provided with bosses, respectively, and said upper and lower radius rods are formed with connecting shafts which extend through the bosses, respectively, along axes of the radius rods, and wherein annular elastomers are bonded between a pair of outer support plates secured to opposite ends of each connecting shaft and a pair of inner support plates carried at opposite ends of each boss between the outer support plates, a portion of each outer support plate, which is bonded with the associated elastomer, formed into a tapered shape and which is located closer to the associated boss at a radially outer portion thereof.

6. A suspension system according to claim 1, wherein the front ends of said radius rods are separately connected to a member which is pivotally connected to the vehicle body.

7. A suspension system according to claim 1, wherein the front ends of said radius rods are connected to each other relatively rotatably, 8. A suspension system for an automobile comprising:
a swingable link system including
   a knuckle which caries a wheel of the automobile, and
   a pair of upper and lower control arms linked to said knuckle and pivotally connected at base ends thereof to a vehicle body for vertical swinging movements; and
a pair of upper and lower radius rods connected at respective rear ends thereof to upper and lower portions of the swingable link system,
   front ends of the radius rods connected together and pivotally connected to the vehicle body for vertical swinging movements,
   an included angle is defined as being between two straight lines which connect a pivoted point of said radius rods to the vehicle body with said rear ends of the radius rods, respectively, said included angle to be an acute angle, said upper and lower control arms are connected at tip ends thereof to said knuckle at locations inside a rim of said wheel, and the rear ends of said upper and lower radius rods are connected to intermediate portions of said upper and lower control arms, respectively, at locations outside the wheel rim.

9. A suspension system according to claim 8, wherein said upper and lower radius rods are disposed such that a first resultant force of a first pulling force and a compressing force, which act on the radius rods along said two straight lines during braking of the wheel, is directed substantially perpendicularly to a second resultant force of second and third pulling forces which act on the radius rods along the two straight lines when a load has been applied to a central portion of the wheel in a longitudinal direction of the vehicle body.

10. A suspension system according to claim 9, wherein said elastic support member has a spring constant set to be large in a direction of said first resultant force and to be small in a direction of said second resultant force.

11. A suspension system according to claim 8, wherein at least one of the radius rods is elastically flexible and the front ends of the radius rods are secured to each other.

12. A suspension system according to claim 8, wherein said upper and lower control arms are provided with bosses, respectively, and said upper and lower radius rods are formed with connecting shafts which extend through the bosses, respectively, along axes of the radius rods, and wherein annular elastomers are bonded between a pair of outer support plates secured to opposite ends of each connecting shaft and a pair of inner support plates carried at opposite ends of each boss between the outer support plates, a portion of each outer support plate, which is bonded with the associated elastomer, formed into a tapered shape and which is located closer to the associated boss at a radially outer portion thereof.

13. A suspension system according to claim 8, wherein the front ends of said radius rods are separately connected to a member which is pivotally connected to the vehicle body.

14. A suspension system according to claim 8, wherein the front ends of radius rods are connected to each other relatively rotatably.

* * * * *